May 31, 1949.  V. L. HUMPHREYS  2,471,958
PROTECTIVE DEVICE FOR CASTERS
Filed March 5, 1945

Inventor
Velma L. Humphreys
by
Attorney

Patented May 31, 1949

2,471,958

UNITED STATES PATENT OFFICE 2,471,958

PROTECTIVE DEVICE FOR CASTERS

Velma L. Humphreys, Portland, Oreg.

Application March 5, 1945, Serial No. 581,103

6 Claims. (Cl. 16—18)

In barber shops and bob shops it is common experience to have the floors littered with short pieces of hair. Various items of equipment, such as chairs, tables, stands and the like are supported by casters or other wheeled supports and as they roll over said hair it adheres to the periphery of the wheels and is deposited upon and collects about the pivot axis of the wheels. This tends to prevent the free rotation of said wheels and also produces an unsanitary condition. The hair is difficult to remove and frequently requires that the casters be replaced, if they cannot be taken apart, or it requires a substantial operation to clean them.

The object of my invention is to provide a casing adapted to encompass casters or other wheeled supports. Said casing has a peripheral encompassing brush element which brushes the floor and tends to sweep said bits of hair from the path of the wheels so as to prevent said bits of hair from coming into contact with the wheels.

A further and more specific object of my invention is to provide a device of this character which may easily and quickly be attached to a caster and preferably to provide such a device with a removable brush which may be easily and inexpensively replaced when a brush element becomes worn.

A further and more specific object of my invention is to provide a device of this character which is made of two hinged halves adapted to grip the non-rotatable base of a caster so that it may be easily attached to the latter. The brush element preferably has an annular base of fixed compass adapted resiliently to engage or snap over the margin of said casing halves to bind and hold the casing halves in a gripping relation with the base of said caster.

Figure 1:
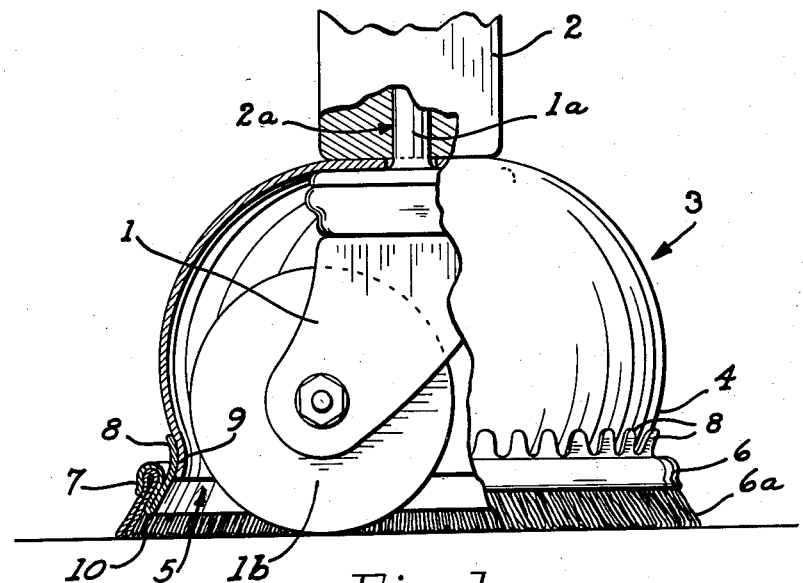
Figure 2:
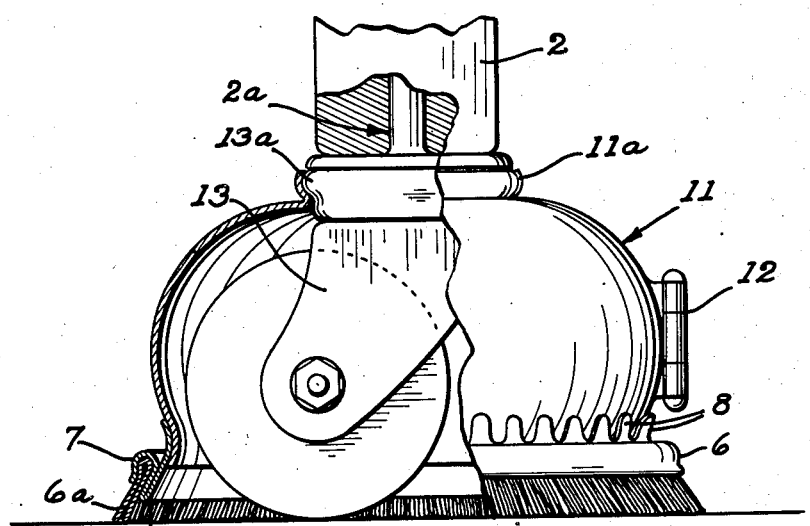

Further and other details of my invention are hereinafter described with relation to the accompanying drawings, in which:

Fig. 1 is an elevation of one embodiment of my invention with portions of the casing and of the leg carrying the caster shown broken away to disclose the details of construction of said device, and Fig. 2 is a similar view of a modification of my invention which may easily and securely be fixed to a caster without requiring it to be removed from place on said leg.

My invention is adapted for use with a caster 1 supported in a leg 2 of a piece of furniture, such, for example, as a chair, table, stand or the like. Said casters preferably have a shank 1a seated in a recess or socket 2a, formed longitudinally on said leg. Said casters normally are provided with inserted sockets and other devices with which the shank engages to provide a secure foundation, to prevent inadvertent retraction and yet permit said casters to be removable for repair or replacement.

For such casters I provide a protective device including a casing 3 formed approximately to the sweep of the caster wheel 1b. That is, the caster is arranged to trail to some degree behind the shank and thus said casing must be substanitally larger than the diameter of said wheel. The casing should conform quite closely to the sweep of the caster, however, so as not to be cumbersome, and only sufficient clearance is provided to permit free swivelling action for the caster.

Said casing has a skirt portion 4 defining an open side 5 thru which the caster wheel projects. The said skirt portion preferably terminates above the floor upon which the under side of the wheel 1b rests. The remaining space is covered by an annular brush element 6 having bristles 6a pendently mounted therein. Said bristles should be of such length as to sweep the floor to prevent hair or other fine objects passing under the tips thereof, but should not be so long as to tend to cause them to bow and drag.

Said brush element has a base element 7, preferably made of metal or other relatively rigid material in which the bristles are mounted. Projecting upwardly from said base is a series of spaced resilient fingers or gripping elements 8 positioned to engage the skirt portion of the casing. Preferably a groove 9 is formed about the marginal edge of said skirt. The fingers or gripping elements are complementarily formed to seat securely in said groove. Said engagement tends to prevent the brush element from inadvertently being disengaged but yet it permits the brush element to be removed for replacement or repair. Said base element preferably has an oblique lip formed thereon underlying the bristles and diverging downwardly so that the bristles are disposed obliquely to a vertical plane, as is shown in Fig. 1. This tends to hold the tips of the bristles outwardly to prevent them from bowing and to cause them efficiently to brush up hair and other fine particles of material. Said bristles may be made of any type of stock, such, for example, as horsehair, fibre and the like, which efficiency and cost dictate.

Said casing is initially secured about the caster by removing the latter from the leg, placing the casing in the position shown in Fig. 2 and then forcing the shank of the caster into the recess or socket in said leg. Said casing preferably is made of relatively light material so as not to destroy the seating relation of the shank in said recess or socket, and thus said protective device can be adapted readily to standard construction.

With some types of casters it is difficult or impractical to remove them from the leg of a piece of furniture. To this end, I provide a modification shown in Fig. 2 in which the casing 11 is made in two halves, joined by a hinge 12. Said hinge swings about a vertical axis, so the two halves can be closed so that when their marginal edges come into abutment, the casing defines a complete whole. The upper portion 11a is cupped and engages the fixed base 13a of a caster 13. This engagement holds the casing centrally of the caster and permits the caster wheel to swivel about its axis. An annular brush element 6, similar to the one shown in Fig. 1, may encompass the marginal edge of said casing, and, being of fixed compass, tends to hold the two hinged halves together with the cupped upper portion firmly in engagement with the base 13a. Other than this structural difference, the two embodiments are the same, and the same letters of reference are given to all of the common parts.

I claim:

1. In a caster, a relatively rigid casing having a skirt, its marginal edge defining a lower open side for said casing, and adapted to have a caster wheel rotatably mounted therein and positioned to project thru said open side, an annular brush element secured to said skirt, said brush element having bristles projecting to the plane of the under surface of the caster wheel, and means underlying said bristles and tending to hold said bristles outwardly at a substantial diverging angle with respect to a vertical plane.

2. In a caster, a relatively rigid casing having a skirt, its marginal edge defining a lower open side for said casing, and adapted to have a caster wheel rotatably mounted therein and positioned to project thru said open side, an annular brush element secured to said skirt, said brush element having bristles projecting to the plane of the under surface of the caster wheel, and an obliquely disposed lip carried by said skirt underlying said bristles and tending to hold said bristles outwardly at a substantial diverging angle with respect to a vertical plane.

3. In a caster, a relatively rigid casing having a skirt, its marginal edge defining a lower open side for said casing, a caster wheel rotatably mounted therein and positioned to project thru said open side, an annular brush element secured to the marginal edge of said skirt, said brush element having bristles projecting to the plane of the under surface of the caster wheel, and resilient gripping elements for said brush element detachably engaging the marginal edge portion of said skirt.

4. In a caster, a relatively rigid casing having a skirt, its marginal edge defining a lower open side for said casing, a caster wheel rotatably mounted therein and positioned to project thru said open side, the marginal edge of said skirt adjacent said open side defining an annular groove, an annular brush element secured to the marginal edge of said skirt, said brush element having bristles projecting to the plane of the under surface of the caster wheel, and resilient gripping elements for said brush element detachably engaging the grooved marginal edge portion of said skirt.

5. In a caster, a relatively rigid casing having a skirt, its marginal edge defining a lower open side for said casing, a caster wheel rotatably mounted therein and positioned to project thru said open side, said casing comprising two hingedly connected halves encompassing and gripping the base of said caster, the marginal edge of said skirt adjacent said open side defining an annular groove, an annular brush element secured to the marginal edge of said skirt, said brush element having bristles projecting to the plane of the under surface of the caster wheel, said brush element being of fixed compass and, in place, holding said hingedly connected casing halves in gripping relation with said base, and resilient gripping elements for said brush element detachably engaging the grooved marginal edge portion of said skirt.

6. In a caster, a relatively rigid casing having a skirt, its marginal edge defining a lower open side for said casing, a caster wheel rotatably mounted therein and positioned to project thru said open side, said casing comprising two hingedly connected halves encompassing and gripping the base of said caster, the marginal edge of said skirt adjacent said open side defining an annular groove, an annular brush element secured to the marginal edge of said skirt, said brush element having bristles projecting to the plane of the under surface of the caster wheel, said brush element being of fixed compass and, in place, holding said hingedly connected casing halves in gripping relation with said base, resilient gripping elements for said brush element detachably engaging the grooved marginal edge portion of said skirt, and means underlying said bristles and tending to hold said bristles outwardly at a substantial diverging angle with respect to a vertical plane.

VELMA L. HUMPHREYS.

REFERENCES CITED

The following references are of record in the file of this patent:

UNITED STATES PATENTS

| Number | Name | Date |
| --- | --- | --- |
| 321,518 | Moore | July 7, 1885 |
| 1,068,485 | Davidson | July 29, 1913 |
| 2,046,384 | Katcher | July 7, 1936 |